US012432067B2

(12) United States Patent
Kozhaya et al.

(10) Patent No.: US 12,432,067 B2
(45) Date of Patent: Sep. 30, 2025

(54) METHOD FOR AUTHENTICATING DISTRIBUTED VOTES FOR A DISTRIBUTED SYSTEM

(71) Applicant: ABB Schweiz AG, Baden (CH)

(72) Inventors: David Kozhaya, Dietikon (CH); Maelle Kabir-Querrec, Aarburg (CH)

(73) Assignee: ABB Schweiz AG, Baden (CH)

( * ) Notice: Subject to any disclaimer, the term of this patent is extended or adjusted under 35 U.S.C. 154(b) by 528 days.

(21) Appl. No.: 17/990,818

(22) Filed: Nov. 21, 2022

(65) Prior Publication Data
US 2023/0171109 A1 Jun. 1, 2023

(30) Foreign Application Priority Data
Nov. 26, 2021 (EP) .................................. 21210774

(51) Int. Cl.
*H04L 9/32* (2006.01)
(52) U.S. Cl.
CPC .......... *H04L 9/3239* (2013.01); *H04L 9/3247* (2013.01); *H04L 2209/463* (2013.01)
(58) Field of Classification Search
None
See application file for complete search history.

(56) References Cited

U.S. PATENT DOCUMENTS

| 11,222,009 B2* | 1/2022 | Shi ....................... G06F 16/2365 |
| 11,902,456 B2* | 2/2024 | Zamani .................... H04L 9/50 |
| 2019/0258610 A1* | 8/2019 | Dang ..................... H04L 9/3247 |
| 2019/0305938 A1* | 10/2019 | Sandberg-Maitland ..................... H04L 9/085 |
| 2021/0342297 A1* | 11/2021 | Gupta ................... G06F 16/128 |

(Continued)

FOREIGN PATENT DOCUMENTS

| WO | WO-2020098840 A3 * | 12/2020 | ........... H04L 9/3247 |
| WO | WO-2021050929 A1 * | 3/2021 | ........... H04L 9/3265 |

(Continued)

OTHER PUBLICATIONS

Maofan Yin, HotStuff: BFT Consensus with Linearity and Responsiveness, 2019, Processing of the 2019 ACM Symposium on Principles of Distributed Computing, ACMPUB27, New York, NY, USA, pp. 347-356. (Year: 2019).*

(Continued)

*Primary Examiner* — Joseph P Hirl
*Assistant Examiner* — Hassan Saadoun
(74) *Attorney, Agent, or Firm* — McCarter & English, LLP

(57) ABSTRACT

Described herein is a system and a method for authenticating distributed votes for a distributed system. The distributed system includes a plurality of nodes and at least one leader node. The method includes: sending out, by the leader node, a prepare message including a proposal; generating, by each of at least some of the plurality of nodes, a set of hash values; generating, by each of the at least some of the plurality of nodes, a reply message to the leader node including the set of hash values; signing, by each of the at least some of the plurality of nodes, the reply message with a digital signature; sending, by each of the at least some of the plurality of nodes, the reply message with the digital signature; and validating, by the leader node, the signatures of the reply messages and saving the sets of hash values.

20 Claims, 3 Drawing Sheets

(56) References Cited

U.S. PATENT DOCUMENTS

2023/0108514 A1* 4/2023 Muhia .................. H04L 9/3073 713/176

FOREIGN PATENT DOCUMENTS

| WO | WO-2023009230 A1 * | 2/2023 | ......... H04L 63/0442 |
| WO | WO-2023055512 A1 * | 4/2023 | ............... H04L 9/50 |

OTHER PUBLICATIONS

Christopher Natoli et al: "Deconstructing Blockchains: A Comprehensive Survey on Consensus, Membership and Structure", arxiv.org, Cornell University Library, 201 Olin LibraryCornell University Ithaca, NY 14853, Aug. 22, 2019 (Aug. 22, 2019), XP081467646.
Sotirios Brotsis et al: "On the Suitability of Blockchain Platforms for IoT Applications: Architectures, Security, Privacy, and Performance",arxiv.org, Cornell University Library, 201 Olin Library Cornell University Ithaca, NY 14853, Sep. 6, 2021(Sep. 6, 2021), XP091052325, DOI: 1 0.101 6/J.COMNET.2021.108005.
Yin Maofan Tedyin@CS Cornell Edu et al: "HotStuff BFT Consensus with Linearity and Responsiveness", Proceedings of the 2019 ACM Symposium on Principles of Distributed Computing, ACMPUB27, New York, NY, USA, Jul. 16, 2019 (Jul. 16, 2019), pp. 347-356, X P058453892, DOI: 10.11451329361 1.3331591 ISBN: 978-1-4503-6217-7.
Boneh Dan et al: "Short Signatures from the Weil Pairing",Journal of Cryptology, Springer US, New York,vol. 17,No. 4,Jul. 30, 2004 (Jul. 30, 2004), pp. 297-319, XP037087813,ISSN: 0933-2790, DOI: 1 0.1 007/5001 45-004-0314-9.
Jiashuo Zhang et al: "Efficient Byzantine Fault Tolerance using Trusted Execution Environment: Preventing Equivocation is only the Beginning", arxiv.org, Cornell University Library, 201 Olin Library Cornell University Ithaca, NY 14853, Jul. 6, 2021 (Jul. 6, 2021), XP091002461.
Extended European Search Report for European Application No. 21210774.2, dated May 20, 2022, 10 pages.

* cited by examiner

METHOD FOR AUTHENTICATING DISTRIBUTED VOTES FOR A DISTRIBUTED SYSTEM

CROSS-REFERENCE TO RELATED APPLICATION

This application claims priority to European Patent Application No. 21210774.2, filed Nov. 26, 2021, and titled "METHOD FOR AUTHENTICATING DISTRIBUTED VOTES FOR A DISTRIBUTED SYSTEM", which is hereby incorporated by reference in its entirety.

BACKGROUND

The present disclosure proposes a new method and system for authenticating distributed votes for a distributed system.

In distributed system, performance capacities of different entities can vary significantly. For example, a system may have one or more servers with high processing power and a plurality of devices having strongly limited performances due to hardware restrictions and/or limited battery lives.

Authenticated voting is a crucial step in any distributed system and especially in agreement algorithms such as those used in blockchain and distributed ledger systems. While the authenticity of votes can be achieved using digital signatures, the process of signing, aggregating, and/or verifying of such signatures can be expensive and hence hinders performance and scalability of systems using them.

However, distributed systems have to be fault-tolerant. In particular, Byzantine fault-tolerant distributed systems including blockchain and distributed ledger systems rely on agreement protocols to ensure the consistency of the data being read or written. Such agreement protocols typically operate in views, where nodes are supposed to vote on multiple phases before a single view is concluded. In order to ensure the agreement protocol's resilience to malicious behavior, many such protocols require votes to be authenticated for them to be counted. Authenticity of votes can be guaranteed by appending a digital signature to every vote sent which requires processing power during the signing process and processing power during the validation process.

Accordingly, there is a need to improve the authenticating process during a distributed voting process in a distributed system.

BRIEF DESCRIPTION

A computer-implemented method for authenticating distributed votes for a distributed system is suggested. The distributed system has a plurality of nodes and at least one leader node authorized to make a proposal, the method including: sending out, by the leader node, a prepare message containing a proposal; generating, by each of the at least some of the plurality of nodes, a set of hash values based on a set of unique phrases, where each hash value of the set of hash values is obtained by applying a hash function on a unique phrase from the set of unique phrases; generating, by each of the at least some of the plurality of nodes, a reply message to the leader node including the set of hash values; signing, by each of the at least some of the plurality of nodes, the reply message with a digital signature; sending, by each of the at least some of the plurality of nodes, the reply messages with the digital signature; validating, by the leader node, the signatures of the reply messages and saving the sets of hash values; the method further includes at least one repetition of the following steps: sending, by each of the at least some of the plurality of nodes, a vote message including one of the unique phrases of the set of unique phrases, if the node agrees with the proposal, wherein the unique phrase of the set of unique phrases changes in each repetition; generating, by the leader node, if one or more vote messages are received, a plurality of voting hash values based on the vote messages; generating comparisons of the voting hash values with the sets of hash values; validating a plurality of votes on the proposal based on the comparisons; the method further including: making, by the leader node, a decision on the proposal based on the last validated plurality of votes; and accepting, by each of the at least some of the plurality of nodes, the decision on the proposal.

The voting process for a plurality of proposals can be structured in views or rounds. The nodes vote for one proposal in one view. The at least one leader node may be a leader node in a first view and may be a non-leader node in a second view.

A distributed system having a plurality of nodes and at least one leader node authorized to make a proposal is also suggested. At least some of the plurality of nodes and the leader node each include a processor, wherein the processors are configured to perform the method described herein.

A distributed system having a plurality of nodes and at least one leader node authorized to make proposals, wherein at least some of the plurality of nodes and the leader node each include a processor, the processors being configured to perform the following operations: sending out, by the leader node, a prepare message containing a proposal; generating, by each of the at least some of the plurality of nodes, a set of hash values based on a set of unique phrases, where each hash value of the set of hash values is obtained by applying a hash function on a unique phrase from the set of unique phrases; generating, by each of the at least some of the plurality of nodes, a reply message to the leader node including the set of hash values; signing, by each of the at least some of the plurality of nodes, the reply message with a digital signature; sending, by each of the at least some of the plurality of nodes, the reply messages with the digital signature; validating, by the leader node, the signatures of the reply messages and saving the sets of hash values; the method further includes at least one repetition of the following steps: sending, by each of the at least some of the plurality of nodes, a vote message including one of the unique phrases of the set of unique phrases, if the node agrees with the proposal, wherein the unique phrase of the set of unique phrases changes in each repetition; generating, by the leader node, if one or more vote messages are received, a plurality of voting hash values based on the vote messages; generating comparisons of the voting hash values with the sets of hash values; validating a plurality of votes on the proposal based on the comparisons; the method further including: making, by the leader node, a decision on the proposal based on the last validated plurality of votes; and accepting, by each of the at least some of the plurality of nodes, the decision on the proposal.

For distributed votes for a distributed system, it is not only important that each node can vote but also that a final voting decision is spread and accepted by all non-malicious nodes. Furthermore, a voting decision of one node may depend on a voting decision of other nodes. A node may change its vote if other nodes vote differently. Therefore, a plurality of back-and-forth communication is necessary to enforce consistent operation in a distributed system. This communication can be structured in phases. The method contains at least two voting phases.

While the authenticity of votes in prior art concepts can be achieved using digital signatures for each phase of a voting process (view), the process of signing, aggregating, and/or verifying of such signatures can be expensive and hence hinders performance and scalability of systems using them. The present disclosure minimizes the number of times signing and verifying signatures in a voting process. In particular, the present disclosure enables a node in a distributed system to use a single signature per view for a plurality of successive votes in that view while still guaranteeing the authenticity of every vote. A vote may be necessary in each phase of the view.

The use of digital signatures alone means that for every vote there is at least one node that must sign and one other node that needs to verify. Regardless of the signature scheme used, the process of signing and/or verifying every vote can be cumbersome and induces large overhead that slows down the system. Such a slowdown impacts the throughput of the system and applications.

The present disclosure is focused on minimizing the use of signatures which results in less overhead when voting and hence minimizes performance overhead of distributed systems including blockchains and distributed ledgers. In particular, nodes of a distributed system can participate in a voting process with less processing consumption and less energy consumption. This improves in particular systems with a plurality of nodes having hardware restrictions and/or limited access to energy.

As a result, industrial applications developed on top of distributed systems utilizing the present disclosure can benefit from higher throughput for processing proposals, like for example customer transactions.

In some examples, a node can either agree ("Yes") or disagree ("No") with the leader's proposal. Therefore, no amendments of the proposals are possible for non-leader nodes.

The suggested method and system allow authenticating distributed votes efficiently. The method allows blockchains and distributed ledger systems to have a higher throughput for validating transactions as it reduces the overhead within the agreement protocols on which such systems are built, and which rely heavily on authenticated voting. In some embodiments, the method is used for a blockchain and/or a distributed ledger system and the proposals include one or more transactions of a token of the blockchain and/or distributed ledger system. A token can represent, for example, a unit of account defined by the blockchain or ledger.

In some examples, the proposal includes one or more transactions of tokens from one address to another address on a blockchain or distributed ledger. In particular, a voting decision of a node can be based on a verification process of the transaction. For example, the transaction can be considered as valid, if the one address has a sufficient amount of tokens for the transaction. The amount of tokens can be calculated based on previous transactions in the blockchain or distributed ledger.

The distributed system has a plurality of nodes and one leader node per view authorized to make proposals. The system can have a plurality of leader nodes in multiple views. A leader node may participate in a voting process of the method as a "non-leader" node. However, in every view according to the present disclosure, at least one leader node participates as a leader node and sends out a prepare message containing a proposal.

The method includes a set of unique phrases. The method includes at least one repetition, which means at least two voting phases and at least two corresponding voting messages including one of the unique phrases. The set can be a list of unique phrases. The phrases are unique in that they cannot be calculated or predicted by other nodes in the system. For example, the unique phrase is generated by a participating node by a random function. The knowledge of elements from the set of unique phrases replaces the authentication of subsequent votes via a digital signature. Each unique phrase may be, for example, a random combination of letters and/or numbers. The set of unique phrases includes at least two unique phrases for the at least two voting phases.

The set of hash values is generated using a hash function also known as cryptography hash function. In particular, each hash value of the set of hash values is generated independently based on a single unique phrase of the set of unique phrases. The hash function is non-invertible. Hashing is a computationally and storage space-efficient method. Generating or verifying a hash value is generally much faster and more efficient than digitally signing a message.

The hash function can be an unkeyed cryptographic hash function. In particular, the hash function can be a Secure Hash Algorithm (SHA) and specifically a SHA-2 hash algorithm.

The hash function is also used to compute the voting hashes. The voting hashes are computed by applying the same hash function on the vote message or the portion of the vote message containing a voting phrase. Hash functions can also be applied to empty Strings if an empty vote message is received.

According to an aspect, the set of hash values of each of the at least some of the plurality of nodes are at least partially based on the set of unique phrases of the respective node and a unique node identifier of the respective node, wherein the vote messages include the unique node identifier of the respective node. For example, the hash function may be applied on one of the unique phrases from the set of unique phrases followed by a comma, followed by the unique node identifier. The unique node identifier may be a number or an address, for example, the MAC-address of the respective node. With the unique node identifier, a vote can later be correlated to the node, so that it is clear for the other nodes what each node voted. In that case, the unique node identifier is also part of the vote messages, so that the hash function can be applied similarly to calculate the voting hashes.

The method includes signing, by each of the at least some of the plurality of nodes, the reply message with a digital signature. This can be a onetime signing of a reply message with a digital signature. With this single verifying effort, the node can signal to participate in the voting and can vote on the leader's proposal in various voting phases.

Signing, by each of the at least some of the plurality of nodes, the reply message with a digital signature and validating, by the leader node, the signatures of the reply messages use a digital signature algorithm. A digital signature algorithm usually includes a private key and a corresponding public key. The digital signature algorithm includes a signing algorithm that, given a message and the private key, produces a signature, and a signature verifying algorithm that, given the message, public key and signature, either accepts or rejects the message's claim to authenticity. The digital signature can be generated using a digital signature scheme based on, for example, Rivest-Shamir-Adleman (RSA), Digital Signature Algorithm (DSA), Elliptic Curve Digital Signature Algorithm (ECDSA) or Edwards-curve Digital Signature Algorithm (EdDSA).

According to an aspect, the digital signature is configured to uniquely identify and link the signature to the signatory node.

According to an aspect, validating the digital signatures of the reply messages and saving the sets of hash values is at least done by the leader node of the view.

The method can be structured in views. Each view can contain a plurality of phases. For example, two or more voting phases can be included in a view before moving to the commit phase and finally to a new view. In particular, the present method may include that each of the at least some of the plurality of nodes that participates in the voting sends a reply message with a digital signature only once each view. In some examples, the reply messages with the digital signature are sent after the leader node starts a view by sending out the prepare message containing the proposal.

The digitally signed reply message embeds all information needed to vote on all voting phases of the leader's proposal of that view. Specifically, when moving to a new view, every node sends a new signed reply message that contains a number of hash values in the set of hash values corresponding to the number of voting phases of the algorithm.

According to an example, validating a plurality of votes on the proposal based on the comparisons includes: counting an approval vote for each voting hash value identical to one of the hash values of the sets of hash values. Any node can vote by simply sending a vote message including one of the unique phrases which is counted as a "Yes". Not sending a vote message or sending a vote message that does not contain one of the unique phrases is counted as a "No".

In examples, in which the system follows views, a view can have a number of phases that is fixed following a protocol or specification of the system. Any node can vote in each voting phase of a view without the necessity of digital signatures for the voting phases. The number of phases of a protocol can be equal to the number of the hash values in the set of hash values and the number of the unique phrases in the set of unique phrases so that the node can vote in each phase. The set of hash values can include, for example, exactly 2, 3, 4 or 5 hash values.

According to an example, the prepare message can contains a prepare quorum certificate including a voting threshold for legitimizing a voting decision. The current status of the votes and the voting threshold gives the nodes information about the chance that the proposal will be accepted, namely if the voting threshold can be reached repeatedly. The voting threshold may be, for example, above 50%, 66% or 75% acceptance.

The method may further include within the at least one repetition: generating, by the leader node, at the end of a repetition a pre-commit quorum certificate including the number of validated votes and/or the unique phrases of the vote messages, if there is at least one more repetition, and sending, by the leader node, the pre-commit quorum certificate. The pre-commit quorum certificate represents the current status of the votes.

The prepare message may be digitally signed by the leader node. The method may include, validating, by each of the at least some of the plurality of nodes, the prepare message of the leader node.

In some examples, the prepare message contains a prepare quorum certificate including a voting threshold for legitimizing a voting decision.

The pre-commit quorum certificate can also include the sets of hash values of the respective reply messages with validated signatures. This can be done in particular by the leader node. Sending out the hash values of the respective reply messages with validated signatures makes it possible for other nodes to validate the votes of the subsequent voting process without validating digital signatures on its own.

In some cases, a node may adapt its vote during voting phases on a proposal depending on the pre-commit quorum certificate. For example, a node may make a voting decision based on whether a plurality of nodes signal to participate in the vote by sending a valid reply message and/or if it is most likely that a consensus will be reached.

According to an aspect of the agreement mechanism, a plurality of phases is used to ensure that each node can make a voting decision and that each node is aware that other nodes make voting decisions on the same proposal and that all nodes are updated if an agreement is reached.

In particular, the method may further include: storing, by one or more of the plurality of nodes, the sets of hash values of the pre-commit quorum certificate. The one or more of the plurality of (non-leader) nodes can use the hash values of the pre-commit quorum certificate to compare these hash values in the voting phase to hash values of vote messages of the other (non-leader) nodes. A node can participate in a view as a non-leader node in one view and as a leader node in another view. This has in particular the advantage that each node can verify each vote of other nodes without the necessity of further digital signatures.

More specifically, the method can contain a commit phase in which, after validating a plurality of votes, a commit quorum certificate is generated by the leader node, wherein the commit quorum certificate includes the unique phrase of the vote messages of the respective validated votes and/or the number of validated votes. The method may further include; accepting, by the one or more of the plurality of nodes, the commit quorum certificate. The commit quorum certificate can include the total voting result (Yes/No) and/or the number of "Yes"—votes. The commit quorum certificate can also include the unique phrases which can be validated by any node in the system which has stored the sets of hash values of the pre-commit quorum certificate. An acceptance of the non-leader nodes may be based on a voting threshold for legitimizing a voting decision of the prepare quorum certificate. The method may include: validating the commit quorum certificate, by one or more nodes, based on the stored sets of hash values of the pre-commit quorum certificate and the voting threshold for legitimizing a voting decision of the prepare quorum certificate.

In some examples, the method further includes: receiving, by the leader node, vote messages for a predetermined amount of time. This can be particularly in a time synchronous system. After a predetermined amount of time, the leader node may stop to receive vote messages and may count the absence of a vote message as a "no" vote. In other examples, receiving, by the leader node, may be for a predetermined number of received reply messages or of validated votes.

A proposal can include, for example, 100, 1000, 10000 or even more items. Items can be transactions. In some examples, the number of items is predetermined and fixed. In other examples, the number of items can vary in each view.

DRAWINGS

DETAILED DESCRIPTION

In the following detailed description, reference is made to the accompanying drawings, which form a part hereof, and in which are shown by way of illustration specific embodiments of the present disclosure.

As used herein, the terms "having", "containing", "including", "comprising" and the like are open ended terms that indicate the presence of stated elements or features, but do not preclude additional elements or features.

It is to be understood that other embodiments may be utilized, and structural or logical changes may be made without departing from the scope of the present disclosure. The following detailed description, therefore, is not to be taken in a limiting sense. The embodiments described herein use specific language, which should not be construed as limiting the scope of the appended claims. Each embodiment and each aspect so defined may be combined with any other embodiment or with any other aspect unless clearly indicated to the contrary.

Figure 1A:
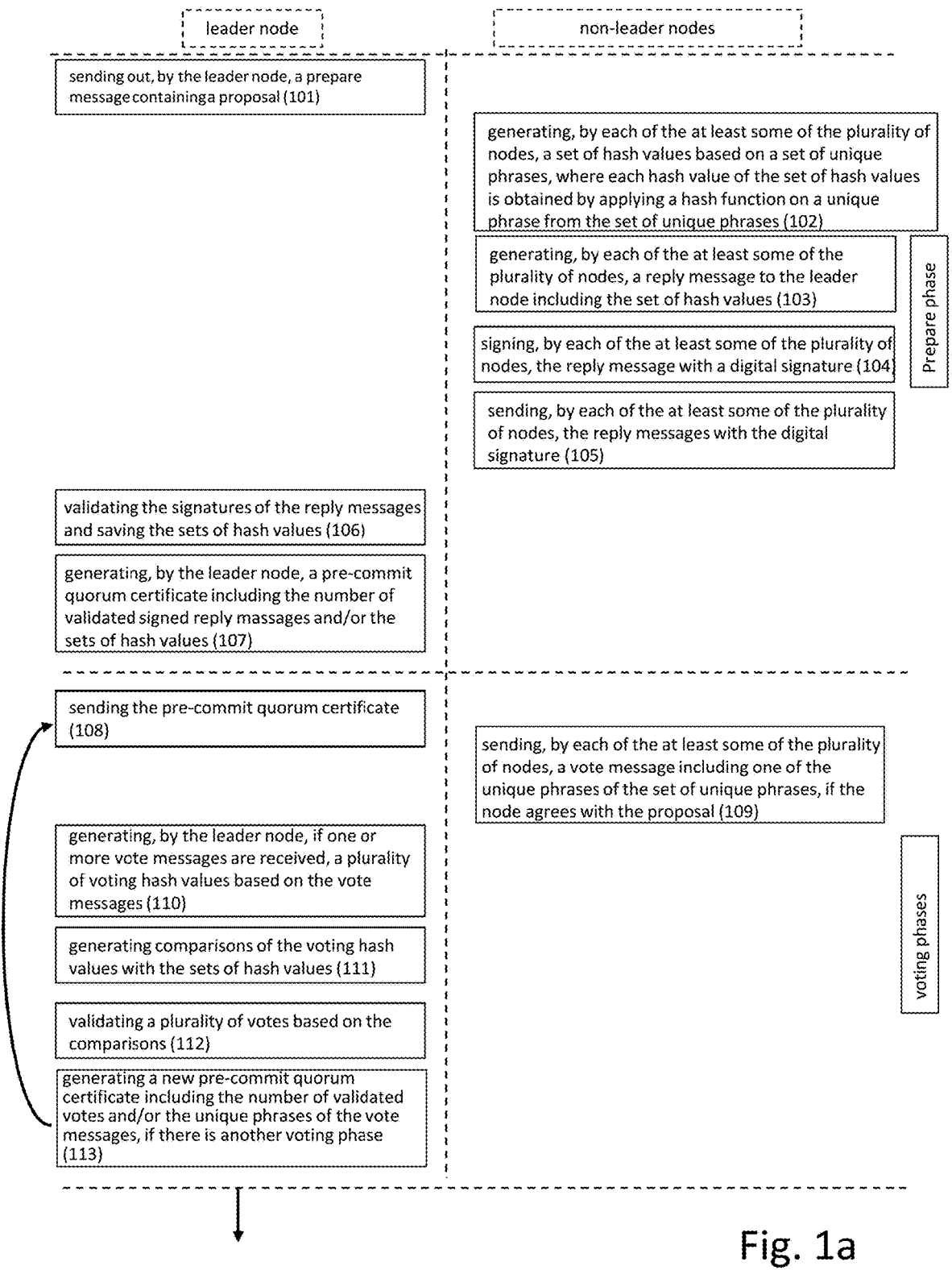
FIGS. 1a and 1b illustrate an example of a method as described herein.
Figure 1B:
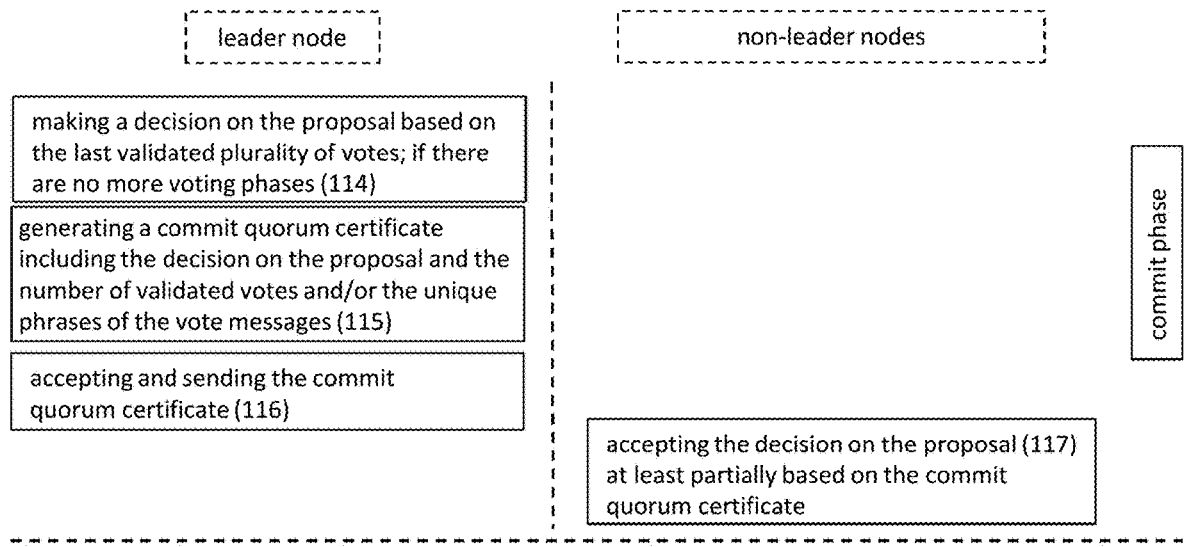
Figure 2:
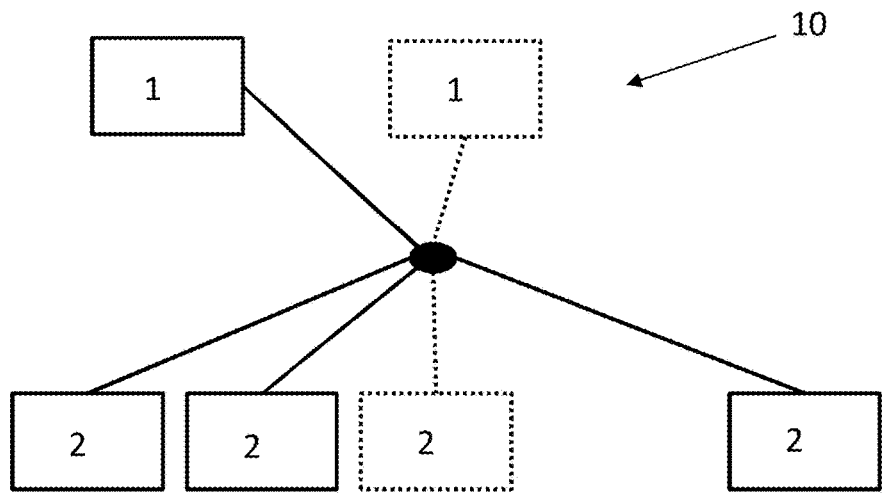
FIG. 2 illustrates a schematic example of a distributed system with a plurality of nodes.

FIG. 2 shows an exemplary embodiment of a distributed system 10 having a plurality of nodes 2 and at least one leader node 1 authorized to make proposals. FIG. 1 shows a simple example of a decentralized system for illustrative purposes with a small number of nodes 1, 2. The nodes 1, 2 are hosted by an infrastructure that includes multiple physical machines. There can be a varying number of nodes 1, 2 in the system. The system can include a small number of nodes 1, 2, for example, about 10, or thousands or even millions of nodes 1, 2. The nodes can be connected via, for example, ethernet networks, WiFi networks, and/or via the internet.

The nodes 1, 2 can be hosted by devices such as PCs, servers, industry 4.0 devices, automation machines, robot systems, network devices, or comparable devices. Devices of the system 10 may be heterogeneous and may provide different resource capacities, for example, computational power, storage and/or energy consumption.

FIGS. 1a and 1b shows an embodiment of the method. The computer-implemented method for authenticating distributed votes for a distributed system having a plurality of nodes and at least one leader node authorized to make proposals includes: sending out, by the leader node, a prepare message containing a proposal 101; generating, by each of the at least some of the plurality of nodes, a set of hash values based on a set of unique phrases, where each hash value of the set of hash values is obtained by applying a hash function on a unique phrase from the set of unique phrases 102; generating, by each of the at least some of the plurality of nodes, a reply message to the leader node including the set of hash values 103; signing, by each of the at least some of the plurality of nodes, the reply message with a digital signature 104; sending, by each of the at least some of the plurality of nodes, the reply messages with the digital signature 105; validating, by the leader node, the signatures of the reply messages and saving the sets of hash values 106; the method further includes at least one repetition of the following steps: sending, by each of the at least some of the plurality of nodes, a vote message including one of the unique phrases of the set of unique phrases, if the node agrees with the proposal 109, wherein the unique phrase of the set of unique phrases changes in each repetition; generating, by the leader node, if one or more vote messages are received, a plurality of voting hash values based on the vote messages 110; generating comparisons of the voting hash values with the sets of hash values 111; validating a plurality of votes on the proposal based on the comparisons 112; the method further including: making, by the leader node, a decision on the proposal based on the last validated plurality of votes 114; and accepting, by each of the at least some of the plurality of nodes, the decision on the proposal 117.

According to the embodiment in FIGS. 1a and 1b, the method may be structured in views, wherein FIGS. 1a and 1b combined show a single view which is structured in a prepare phase, two or more voting phases, and a commit phase. A hash value from the set of hash values is used only once in a given voting phase. The number of voting phases represents the number of required vote messages, which is the number of necessary hash values in the set of hash values. For example, the number of voting phases can be 2, 3, 4 or 5. Accordingly, the method can include 1, 2, 3, or 4 repetitions. Vote messages include one of the unique phrases of the set of unique phrases, if the node agrees with the proposal 109. A unique phrase of the set of unique phrases is only used once.

An advantage of the pre-commit quorum certificates is that the method and the system ensure a more fault-tolerant voting process. The voting status of the participating notes is spread across the system during the voting process. Each node can receive the current voting status from the pre-commit quorum certificate and decide to vote based on previous voting decisions and/or participation in the voting process.

According to an embodiment, the method may include, before generating a reply message, validating if the prepare message has a valid signature and if the leader node is a valid leader node. The prepare message may be digitally signed by the leader node using a digital signature algorithm as described above.

According to an embodiment, before entering the first voting phase, the leader node generates a pre-commit quorum certificate including the number of validated signed reply messages and/or the sets of hash values 107. The first voting phase and all further voting phases can start by sending the pre-commit quorum certificate 108.

During the voting phase and optionally after step 107 or 108, a node can decide to vote "yes" or "no" to the proposal. With the pre-commit quorum certificate, a node can make a voting decision at least partially based on participation and/or votes of the other nodes. Furthermore, the pre-commit quorum certificate may include the sets of hash values and the unique phrases of the previous vote messages. With this information, a non-leader node may generate voting hash values and compare them with the sets of hash values. Each non-leader node may validate the plurality of votes of the other nodes without further digital signatures. This enables a trustless system in which no trust in the leader-node is necessary because trust is replaced by a simple comparison of hash values. In particular, the leader node does not know how the unique phrases correspond to the hash values and therefore cannot change the vote of a node.

According to an embodiment, the method includes generating a new pre-commit quorum certificate including the number of validated votes and/or the unique phrases of the vote messages, if there is another voting phase 113. After each repetition, the pre-commit quorum certificate is updated and sent by the leader node 108.

According to an embodiment, the method includes a predefined number of voting phases. In particular, if a predefined threshold of valid votes is not achieved within a predefined number of voting phases, the corresponding proposal of the leader is rejected.

After all voting phases, the leader node makes a decision on the proposal based on the last validated plurality of votes. The leader node can also generate a commit quorum certificate including the decision on the proposal and the number of validated votes and/or the unique phrases of the vote messages 115. The leader node itself accepts the commit quorum certificate and sends it 116. The decision on the proposal is accepted by the non-leader nodes 117. In some embodiments, the non-leader nodes accept the decision on the proposal (117) at least partially based on the commit quorum, for example, if the voting threshold is reached with the number of validated votes or if the unique phrases of the vote messages are correct and create valid compressions as explained in steps 110 to 112.

Each node now has to accept the proposal to enforce a consistent operation in the distributed system. Nodes that do not accept proposals on which a positive voting decision is reached cannot participate in further voting processes in the next view.

Figure 3A:
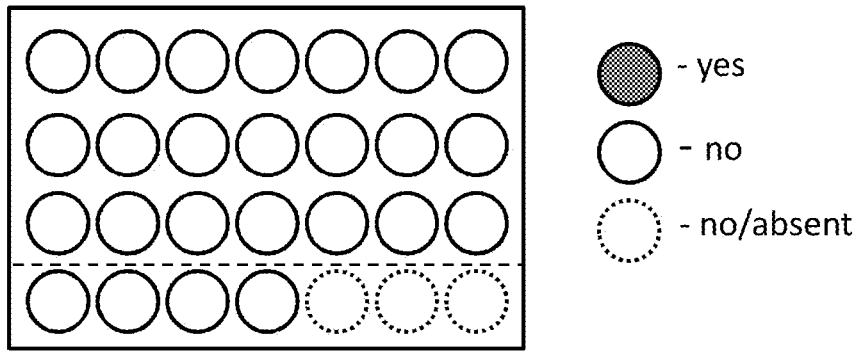
FIGS. 3a to 3c illustrate the voting status in each phase of an example of a method as described herein.
Figure 3B:
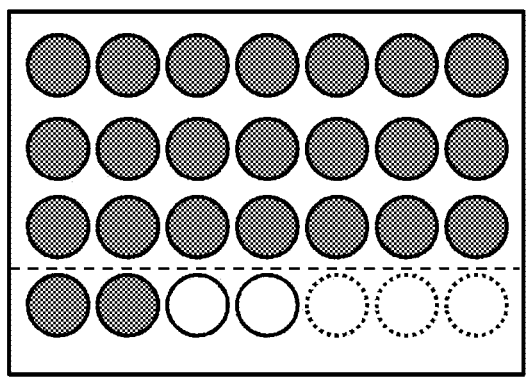
Figure 3C:
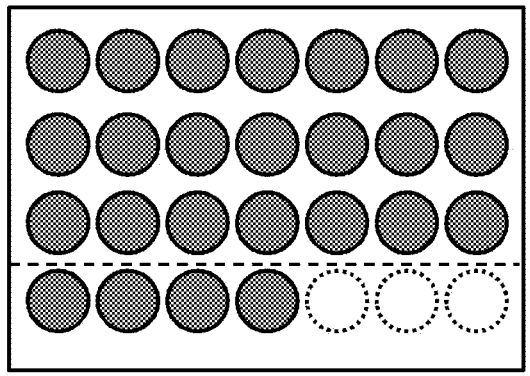

FIGS. 3*a* to 3*c* illustrate an example of the voting process. The exemplary voting process has two voting phases.

FIGS. 3*a* to 3*c* show an exemplary system with 28 nodes. A voting threshold is defined at 75% of the 28 nodes. FIG. 3*a* shows the voting status after the prepare phase. 25 nodes have sent a reply message and want to vote on the proposal. The number of validated signed reply messages is shown as the number of full circles. Three nodes did not reply. The pre-commit quorum certificate can include the number of validated signed reply messages and/or the sets of hash values.

The information in the illustration of FIG. 3*a* can be communicated in a pre-commit certificate. The nodes can either be anonymous (as shown in FIGS. 3*a* to 3*b*) or can be identified with a unique identifier (not shown).

FIG. 3*b* shows the voting status after the first vote messages were sent and after the leader node has validated a plurality of votes based on the comparisons. The voting threshold is reached. Two of the participating nodes in FIG. 3*b* either sent an invalid voting message or no voting message.

FIG. 3*c* shows the result of the second voting phase. The voting threshold is reached and a decision on the proposal can be made by the leader node. After that, all nodes accepted the decision on the proposal. The acceptance can also be based on the commit quorum certificate including the number of validated votes and/or the unique phrases of the vote messages. In particular, the nodes can accept the commit quorum certificate if the voting threshold is reached. Each non-malicious node now has to accept the proposal to enforce a consistent operation in the distributed system.

According to a further embodiment, the leader node sends out a prepare message 101 at the beginning of the view which contains the leader's new proposal and a prepare quorum certificate including a voting threshold for legitimizing a voting decision. The voting threshold may be stored by non-leader nodes to decide if a decision is reached accepted in the end.

After receiving the prepare message, the non-leader nodes check the validity of the proposals. If the node wants to participate in the vote and preliminary wants to accepts the proposal, it sends a reply message to the leader. According to an embodiment, the presence of a valid reply message is considered as a preliminary acceptance vote before the voting round starts.

The method includes validating the signatures of the reply messages and saving the sets of hash values 106. After that and in particular after enough valid reply messages are received, the leader node generates and sends a pre-commit quorum certificate including the number of validated signed reply messages and/or the sets of hash values 107 and 108.

The method may further include: receiving the pre-commit quorum certificate, by each of the at least some of the plurality of nodes and optionally saving the sets of hash values of each of the other nodes. The voting decision can be at least partially based on the number of validated signed reply messages and/or the sets of hash values of each of the other nodes. In particular, with the sets of hash values, votes of the other nodes can be verified similarly to the method steps 110 to 112 by each individual node. This guarantees a trustless system in which malicious behavior of a non-leader node or a leader node can be detected by each node in the system. Every single vote can be validated by other votes without repeating the process of creating and validating digital signatures for each and every vote.

Everything disclosed with regard to the method also corresponds to the system as described herein.

What is claimed is:

1. A computer-implemented method for authenticating distributed votes for a distributed system having a plurality of nodes and at least one leader node authorized to make a proposal, the method comprising:
    sending out, by the leader node, a prepare message including a proposal;
    generating, by each of at least some of the plurality of nodes, a set of hash values based on a set of unique phrases, wherein each hash value of the set of hash values is obtained by applying a hash function on a unique phrase from the set of unique phrases;
    generating, by each of the at least some of the plurality of nodes, a reply message to the leader node including the set of hash values;
    signing, by each of the at least some of the plurality of nodes, the reply message with a digital signature;
    sending, by each of the at least some of the plurality of nodes, the reply message with the digital signature; and
    validating, by the leader node, the digital signatures of the reply messages and saving the sets of hash values,
    wherein the method further comprises at least one repetition of the following:
        sending, by each of the at least some of the plurality of nodes, a vote message including one of the unique phrases of the set of unique phrases, if the node agrees with the proposal, wherein the one of the unique phrases of the set of unique phrases changes in each repetition;
        generating, by the leader node, if one or more vote messages are received, a plurality of voting hash values based on the one or more vote messages;
        generating comparisons of the voting hash values with the sets of hash values; and
        validating a plurality of votes on the proposal based on the comparisons, and
    wherein the method further comprises:
        making, by the leader node, a decision on the proposal based on a last validated plurality of votes; and
        accepting, by each of the at least some of the plurality of nodes, the decision on the proposal.

2. The method of claim 1, wherein the set of hash values of each of the at least some of the plurality of nodes are at least partially based on the set of unique phrases of the respective node and a unique node identifier of the respective node, and wherein the one or more vote messages each include the unique node identifier of the respective node.

3. The method of claim 1, wherein the at least one repetition is 1, 2, 3, or 4 repetitions.

4. The method of claim 1, wherein validating the plurality of votes on the proposal based on the comparisons comprises counting an approval vote for each voting hash value identical to a hash value of the sets of hash values.

5. The method of claim 1, wherein the prepare message includes a prepare quorum certificate including a voting threshold for legitimizing a voting decision.

6. The method of claim 5, further comprising:
generating and sending, by the leader node, a pre-commit quorum certificate after validating the digital signatures of the reply messages, if a number of validated signed reply messages is equal or above the voting threshold, wherein the pre-commit quorum certificate comprises the number of validated signed reply messages and/or the sets of hash values.

7. The method of claim 6, further comprising:
storing, by each of the at least some of the plurality of nodes, the sets of hash values of the pre-commit quorum certificate.

8. The method of claim 1, wherein, within the at least one repetition, the method further comprises:
receiving, by the leader node, the one or more vote messages for a predetermined amount of time.

9. The method of claim 1, wherein the hash function is an unkeyed cryptographic hash function.

10. The method of claim 1, wherein, within the at least one repetition, the method further comprises:
generating, by the leader node, at an end of a repetition of the at least one repetition, a pre-commit quorum certificate including a number of validated votes and/or the unique phrases of the one or more vote messages, if there is at least one more repetition of the at least one repetition, and sending, by the leader node, the pre-commit quorum certificate.

11. The method of claim 1, wherein the digital signature is configured to uniquely identify and link the digital signature to the respective node.

12. The method of claim 11, wherein the digital signature is generated using a digital signature scheme based on Rivest-Shamir-Adleman (RSA), Digital Signature Algorithm (DSA), Elliptic Curve Digital Signature Algorithm (ECDSA) or Edwards-curve Digital Signature Algorithm (EdDSA).

13. A distributed system having a plurality of nodes and at least one leader node authorized to make proposals, wherein at least some of the plurality of nodes and the leader node each comprise a processor, the processors configured to perform the method of claim 1.

14. A distributed system having a plurality of nodes and at least one leader node authorized to make proposals, wherein at least some of the plurality of nodes and the leader node each comprise a processor, the processors configured to perform the following operations:
sending out, by the leader node, a prepare message including a proposal;
generating, by each of at least some of the plurality of nodes, a set of hash values based on a set of unique phrases, wherein each hash value of the set of hash values is obtained by applying a hash function on a unique phrase from the set of unique phrases;
generating, by each of the at least some of the plurality of nodes, a reply message to the leader node including the set of hash values;
signing, by each of the at least some of the plurality of nodes, the reply message with a digital signature;
sending, by each of the at least some of the plurality of nodes, the reply message with the digital signature; and
validating, by the leader node, the digital signatures of the reply messages and saving the sets of hash values,
wherein the operations further comprise at least one repetition of the following:
sending, by each of the at least some of the plurality of nodes, a vote message including one of the unique phrases of the set of unique phrases, if the node agrees with the proposal, wherein the one of the unique phrases of the set of unique phrases changes in each repetition;
generating, by the leader node, if one or more vote messages are received, a plurality of voting hash values based on the one or more vote messages;
generating comparisons of the voting hash values with the sets of hash values; and
validating a plurality of votes on the proposal based on the comparisons, and
wherein the operations further comprise:
making, by the leader node, a decision on the proposal based on a last validated plurality of votes; and
accepting, by each of the at least some of the plurality of nodes, the decision on the proposal.

15. The distributed system of claim 14, wherein the set of hash values of each of the at least some of the plurality of nodes are at least partially based on the set of unique phrases of the respective node and a unique node identifier of the respective node, and wherein the one or more vote messages each include the unique node identifier of the respective node.

16. The distributed system of claim 14, wherein validating the plurality of votes on the proposal based on the comparisons comprises counting an approval vote for each voting hash value identical to a hash value of the sets of hash values.

17. The distributed system of claim 14, wherein the prepare message includes a prepare quorum certificate including a voting threshold for legitimizing a voting decision.

18. The distributed system of claim 17, further comprising:
generating and sending, by the leader node, a pre-commit quorum certificate after validating the digital signatures of the reply messages, if a number of validated signed reply messages is equal to or above the voting threshold, wherein the pre-commit quorum certificate comprises the number of validated signed reply messages and/or the sets of hash values.

19. The distributed system of claim 18, wherein the operations further comprise:
storing, by each of the at least some of the plurality of nodes, the sets of hash values of the pre-commit quorum certificate.

20. The distributed system of claim 14, wherein the hash function is an unkeyed cryptographic hash function.

* * * * *